United States Patent [19]
Kaelin

[11] 3,865,721
[45] Feb. 11, 1975

[54] METHOD FOR INTRODUCTION AND CIRCULATION OF OXYGEN OR OXYGENOUS GAS IN A LIQUID WHICH IS TO BE CLARIFIED, AND APPARATUS FOR CARRYING OUT THE METHOD

[76] Inventor: Joseph Richard Kaelin, Villa Seeburg, CH-6374 Buochs, Switzerland

[22] Filed: Sept. 1, 1972

[21] Appl. No.: 285,918

[30] Foreign Application Priority Data
Sept. 2, 1971   Switzerland.................... 12925/71

[52] U.S. Cl................. 210/7, 210/14, 210/15, 210/195, 210/197, 210/208, 210/219, 210/220, 261/93
[51] Int. Cl.............................. C02c 1/10, B01f 3/04
[58] Field of Search ............................. 210/12–15, 210/49, 205, 207, 208, 219–221, 3–8, 63, 195, 197, 199; 261/36 R, 84, 85, 87, 91, 93

[56] References Cited
UNITED STATES PATENTS

| | | |
|---|---|---|
| 2,530,814 | 11/1950 | Becze et al. ........................ 261/93 |
| 2,554,492 | 5/1951 | Hartman et al. ................ 210/219 X |
| 3,278,170 | 10/1966 | Moritz ............................. 261/93 X |
| 3,353,676 | 11/1967 | Hirsch........................... 210/208 X |
| 3,360,460 | 12/1967 | Weston .............................. 261/91 X |
| 3,682,313 | 8/1972 | Abraham et al. ............... 210/197 X |
| 3,724,667 | 4/1973 | McKinney...................... 210/219 X |
| 3,745,113 | 7/1973 | Fuchs............................. 210/219 X |

*Primary Examiner*—Charles N. Hart
*Assistant Examiner*—Robert H. Spitzer
*Attorney, Agent, or Firm*—Oblon, Fisher, Spivak, McClelland & Maier

[57] ABSTRACT

Method of introducing and circulating oxygen or air in liquid present in an activating basin of a clarifying plant, a surface rotor and a liquid impelling device circulate the liquid up the centre of the basin and helically down the sides. This prevents sludge settling at the bottom and ensures the air bubbles remain in the liquid a longer time than they otherwise would.

18 Claims, 3 Drawing Figures

METHOD FOR INTRODUCTION AND CIRCULATION OF OXYGEN OR OXYGENOUS GAS IN A LIQUID WHICH IS TO BE CLARIFIED, AND APPARATUS FOR CARRYING OUT THE METHOD

The invention relates to a method for introduction and circulation of oxygen or oxygenous gas in a liquid present within an activating basin of a clarification plant, and apparatus for carrying out the method.

It is already known that the liquid present within an activating basin of a clarification plant may be aerated by means of an aerating rotor. However, if particularly deep activating basins are employed, the oxygen introduced is distributed very irregularly within the activating basin, and the liquid situated within the lower portion of the activating basin is insufficiently oxygenated.

Moreover, in these known arrangements, the speed of the liquid which is to be aerated becomes so low at the bottom of the basin as to result in sludge deposits and consequently to onerous cleaning tasks after a relatively short operating period.

An object of the invention is to devise a method which lacks the shortcomings enumerated in the foregoing.

According to the invention there is provided a method of introducing and circulating oxygen or a mixture of gases containing oxygen in a liquid present within an activating basin of a clarifying plant, wherein a surface aerator formed as a rotor generates a circulatory motion of the liquid, and, in at least a region adjacent the upper part of the sidewalls of the basin, a downward flow of liquid, and a liquid impelling device directs a liquid flow upwards to a suction aperture of the surface rotor.

For optimum circulation of the liquid which is to be aerated, it is advantageous if the liquid which is to be circulated is drawn in in the area of the bottom of the basin by the liquid impelling device.

Activated sludge originating from a post-clarification basin may be introduced into a mixing space of the liquid impelling device.

Further according to the invention there is provided a surface aerator formed as a rotor situated in the activating basin for introduction of oxygen into the liquid which is to be aerated, and at least one liquid impelling device whereof the outflow opening is directed towards the suction aperture of the rotor.

It is appropriate for the surface aerator rotor, and the liquid impelling device situated beneath the same, to be interconnected by means of a vertically extending driving shaft. It may be advantageous in this connection, for the vertically extending shaft to have its lower extremity connected to a second preferably volumetrically adjustable liquid impelling device for conveying activated sludge originating from a post-clarification basin into the mixing range of the first-mentioned liquid impelling device.

To avoid the necessity of a long driving shaft, it may alternatively be appropriate to incorporate driving means which move the liquid impelling device situated beneath the surface aerator independently of the surface aerator. In this connection, it is advantageous for the driving means to be connected to a second and preferably volumetrically adjustable liquid impelling device for conveying activated sludge originating from a post-clarification basin into the mixing range of the first-mentioned liquid impelling device.

It is advantageous moreover for the first-mentioned liquid impelling device situated beneath the surface aerator to have adjustable blades for variation of the delivery volume.

The invention is further described by way of example in the following, with reference to the drawings. In these:

Figure 1:
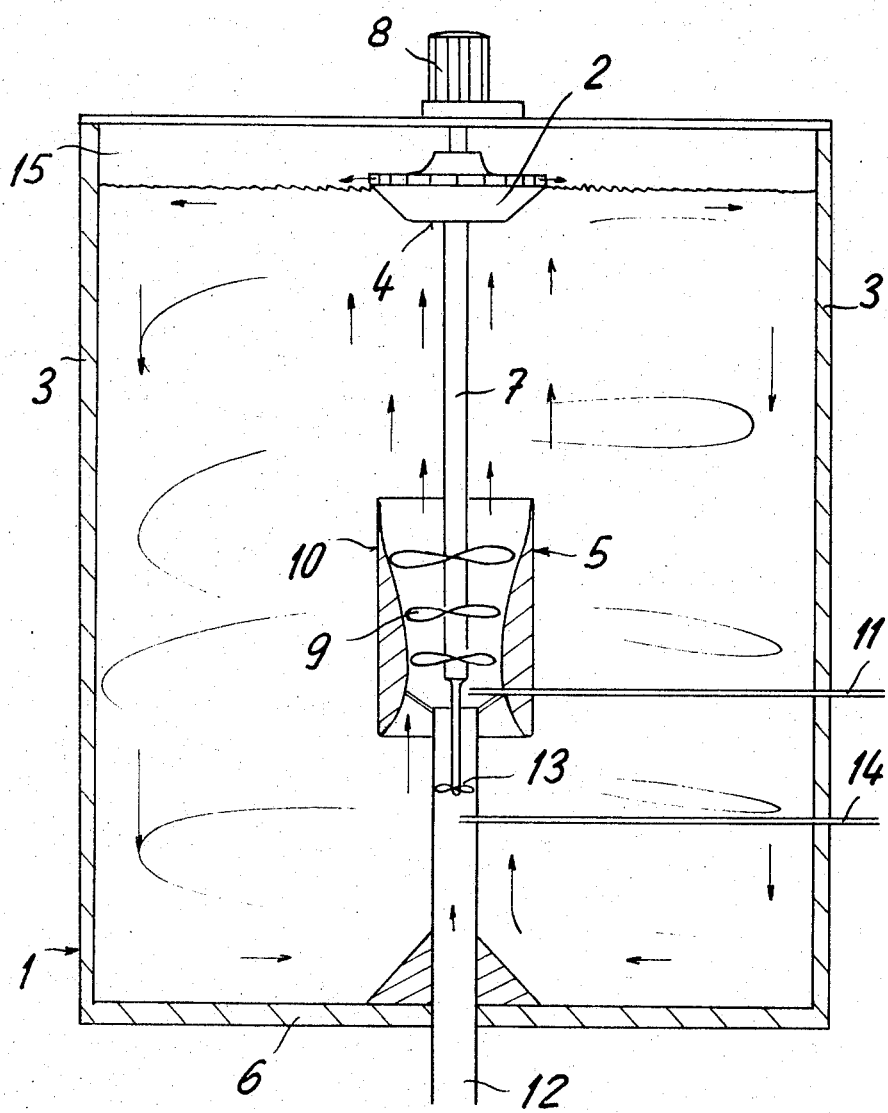
FIG. 1 shows a section through apparatus constituting a first embodiment of the invention.

FIG. 1 is a section through an activating basin 1 of a clarifying plant, wherein are situated a surface aerator 2 formed as a rotor for generation of a swirling motion in the liquid fwhich is to be aerated, as well as of a flow of liquid which is downwardly directed in the upper area of the sides 3 of the basin.

A liquid impelling device 5 is situated beneath the rotor 2 to produce a complementary flow which is upwardly directed towards the suction aperture 4 of the rotor 2 to assist the flow produced by the latter, and has its intake opening situated below the middle of the basin height so that a sufficiently high flow velocity may also be obtained to prevent deposits of sludge within the lower portion of the basin 1.

A flow of liquid having a swirling motion and downwardly directed towards the bottom 6 of the basin in the area of the sides 3 of the basin, is obtained in this manner.

Since the discharge opening of the liquid impelling device 5 is not directly contiguous to the suction aperture 4 of the rotor 2, an additional mixing action is performed between the liquid issuing from the impelling device 5 and flowing upwards, and the liquid adjacent to the same.

The aerating rotor 2 and the liquid impelling device 5 situated beneath the same are interconnected by a vertically extending driving shaft 7, and are so arranged that the driving assembly 8 connected to the aerating rotor 2 may be withdrawn upwards as an unit together with the shaft 7 extending downwards vertically and the blades 9 of the liquid impelling device 5 fastened thereto.

For variation of the volume of liquid delivered by the second liquid impelling device 5 independently of the aerating rotor 2, the former is equipped with adjustable blades 9 which may be adjusted through the hollow shaft 7. Since the discharge opening of the liquid impelling device 5 is not directly contiguous to the intake aperture 4 of the aerating rotor 2, the efficiency of the latter is not affected by variation of the delivery volume of the liquid impelling device 5.

The liquid impelling device 5 comprises blades 9 adjustably arranged on the shaft 7, which blades are surrounded by an annular cylindrical part 10 so that the liquid is conveyed upwards from below in axial direction along the shaft 7. The feed pipe 11 is employed for infeed of pure oxygen or a mixture of gases containing oxygen, as for example air, into the mixing range of the liquid impelling device 5.

The vertically extending shaft 7 has at its lower extremity a second liquid impelling device, shown as screw 13 having adjustable blades and projecting into the feed duct 12, which is employed for conveying activated sludge originating from a post-clarification basin into the mixing range of the liquid impelling device 5. Since the blades of the conveying screw 13 may be adjusted by means of a servo-motor for example, it is possible to adjust the required quantity of the reflux sludge precisely. Another pipe 14 for infeed of pure oxygen or oxygen mixture opens into the feed duct 12, so that the oxygen-poor activated sludge is enriched with oxygen even before emerging from the feed duct 12.

The aerating rotor 2 arranged in centrally symmetrical position generates a slight circulation of the liquid present in the activating basin 1, at a speed of approximately 25 cms/sec and, together with circulatory flow, produces a downwardly directed swirling motion of the liquid which is to be aerated, the oxygen introduced by means of the aerating rotor 2 and the liquid impelling device 5 thereby being thoroughly and uniformly mixed with the liquid which is to be aerated and being moved through the same along a helical trajectory, so that optimum exploitation occurs of the oxygen introduced. No undesirable sludge settling can intervene, since a relatively high speed of flow is obtained at the bottom of the activating basin 1, with this arrangement.

A more substantial and uniform introduction of oxygen into the liquid occurs than was hitherto possible, since the individual air or oxygen bubbles remain within the liquid for longer period than hitherto, because it is no longer the case that they are displaced downwards through only a short partial stretch of the entire basin height before being moved upwards again.

The activating basin 1 may be sealed at the top if pure oxygen is employed, so that oxygen finally emerging into the space 15 from the surface of the liquid is again introduced into the liquid by means of the rotor 2.

To simplify maintanance of the system, the driving assembly 8 connected to the aerating rotor 2 is combined with the shaft 7 extending vertically downwards and the blades 9 and 13 fastened to the latter, to form an upwardly withdrawable unit, so that this unit may be extracted or replaced without draining the activating basin 1.

Figure 2:
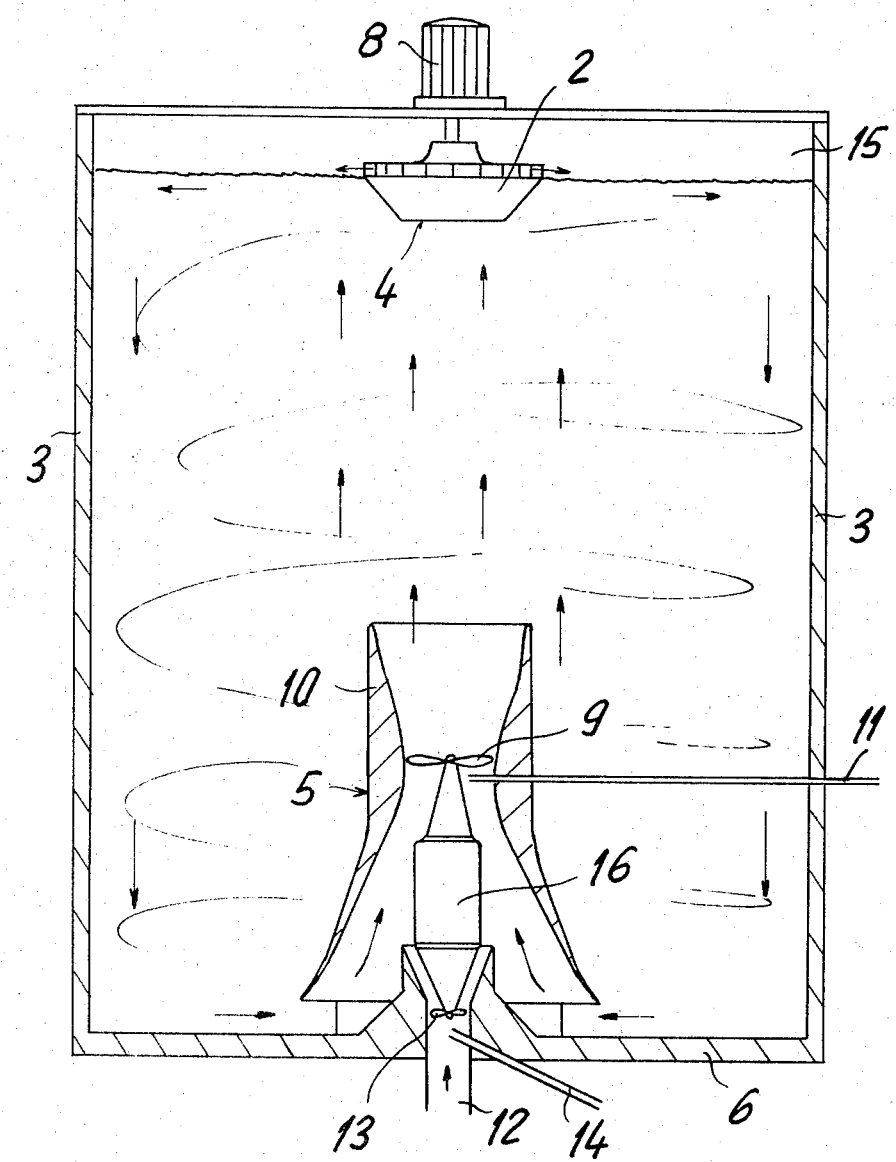
FIG. 2 shows a section through apparatus constituting a second embodiment of the invention.

The system illustrated in FIG. 2 differs from the system shown in FIG. 1, in that the liquid impelling devices 5 and 13 are driven by means of submerged motor 16, independently of the aerating rotor 2. The relatively long driving shaft 7 of the system illustrated in FIG. 1 thereby becomes superfluous.

To ensure that a sufficiently powerful circulation of the liquid occurs as far as into the area of the bottom 6 of the basin, the annular element 10 extends as far as directly above the same.

The system illustrated in FIG. 3 differs from the system shown in FIG. 1, in that the liquid impelling device 5 is situated immediately below the rotor 2, to avoid the necessity of providing a very long driving shaft 7. In this case too, the blades 9 are surrounded by an annular element 10 which causes the flow to follow the required trajectory in the liquid. Without the annular element 10, the blades 9 would impel a considerable proportion of the fluid conveyed in radial instead of axial direction, which would result in an uncontrolled flow within the vessel 1.

Figure 3:
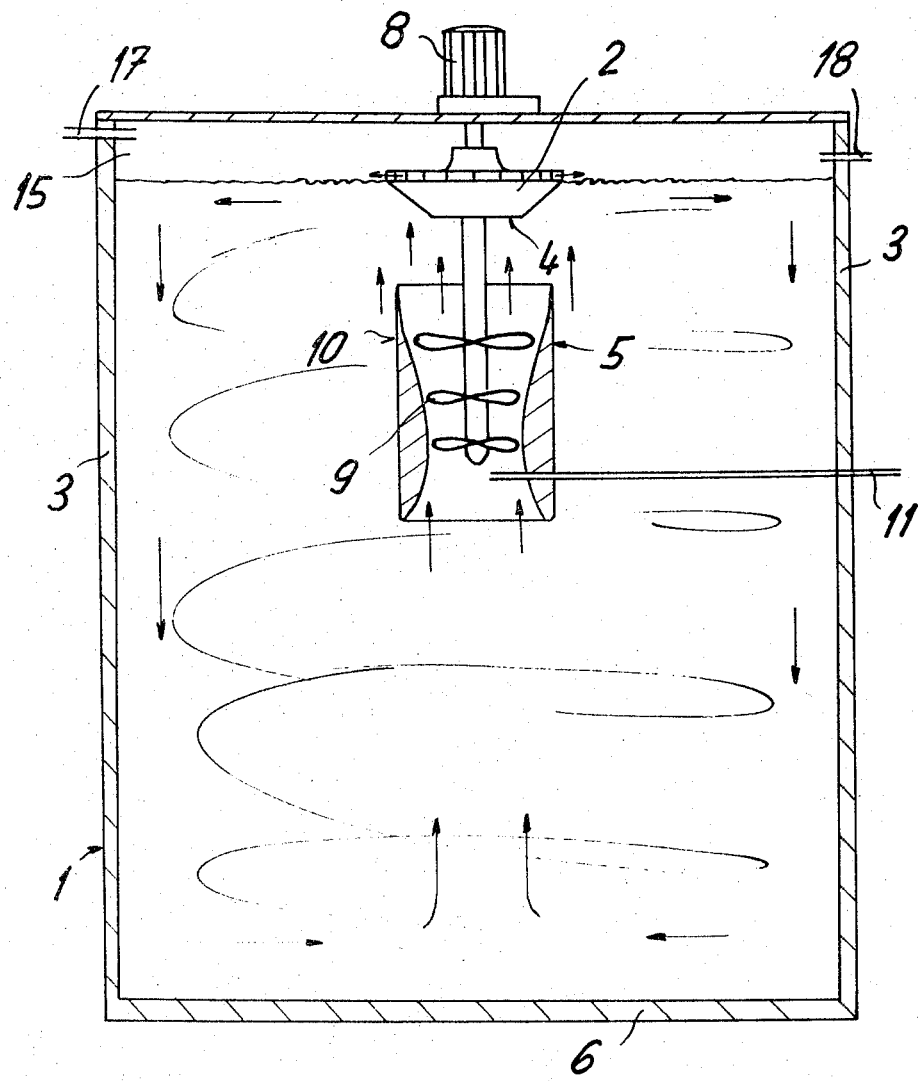
FIG. 3 shows a section through apparatus constituting a third embodiment of the invention.

If pure oxygen is to be introduced into the liquid present in the basin 1, it is appropriate, as illustrated in FIG. 3, for the upper side of the activating basin 1 to be covered, and for a feed pipe 17 to be incorporated for infeed of pure oxygen into the space 15 situated above the liquid surface, and for an outflow pipe 18 to be incorporated for discharge of gases generated during the biological decomposition process.

I claim:

1. A method of introducing and circulating a mixture of gases containing oxygen in a liquid present in an activating basin of a clarifying plant, comprising the steps of:

utilizing a surface aerator formed as a rotor for generating a circulatory, radially outwardly flow of the liquid within the surface region of said liquid toward the sidewalls of said basin, and a downward flow of said liquid along said sidewalls of said basin which commences within said surface region of said liquid and continues downwardly; and utilizing a liquid impeller device disposed non-contiguously below said surface aerator for generating an additional and complementary flow and circulation upwardly within, and along and from the bottom portion of, said basin toward the suction aperture of said surface aerator, whereby a high velocity cyclical flow of said liquid outwardly along said surface of said liquid, downwardly along said sidewalls of said basin, radially inwardly along the bottom portion of said basin, and upwardly toward said surface of said liquid, as well as a spiral motion intermediate said surface and bottom regions and within the vicinity of said sidewalls along the vertical extent thereof, is generated.

2. Method according to claim 1, wherein the liquid which is to be aerated is drawn in in the area of the bottom of the basin by means of the liquid impeller device.

3. Method according to claim 1, wherein activated sludge originating from a post-clarification basin is fed into the mixing range of the liquid impeller device.

4. Method according to subsidiary claim 3, wherein activated sludge originating from a post-clarification basin is enriched with oxygen prior to mixing with the liquid which is to be aerated.

5. Method according to claim 1, wherein pure oxygen or a mixture of gases containing oxygen is fed into the lower mixing range of the liquid impeller device.

6. Apparatus for introducing and circulating a mixture of gases containing oxygen in a liquid present in an activating basin of a clairfying plant, comprising:

an activating basin;

surface aerator means, formed as a rotor and having a suction aperture, for introducing oxygen into said liquid to be aerated and for generating a circulatory, radially outwardly flow of the liquid within said surface region of said liquid toward the sidewalls of said basin, and said downward flow of said liquid along said sidewalls of said basin which commences within said surface region of said liquid and continues downwardly; and liquid impeller means disposed non-contiguously below said surface aerator for generating an additional and complementary flow and circulation upwardly within, and along and from the bottom portion of, said basin toward said suction aperture of said surface aerator.

whereby a high-velocity cylical flow of said liquid radially outwardly along said surface of said liquid, downwardly along said sidewalls of said basin, radially inwardly along said bottom portion of said basin, and upwardly toward said surface of said liquid, inwardly along said bottom portions of said basin, and upwardly toward said surface of said liquid, as well as a spiral motion intermediate said surface and bottom regions and within the vicinity of said sidewalls along the vertical extent thereof, is generated.

7. Apparatus according to claim 6, wherein the surface aerator, and the liquid impeller device situated below the former, are interconnected by a vertically extending driving shaft.

8. Apparatus according to claim 7, wherein the vertically extending shaft has its lower extremity connected to a second liquid impeller device for conveying activated sludge originating from a post-clarification basin into the mixing range of the first-mentioned liquid impeller device.

9. Apparatus according to claim 8, wherein the second liquid impeller device is volumetrically adjustable.

10. Apparatus according to claim 6, wherein driving means are incorporated, which drive the liquid impeller device independently of the surface aerator.

11. Apparatus according to claim 10, wherein the driving means is connected to a second liquid impeller device for conveying activated sludge originating from a post-clarification basin into the mixing range of the first-mentioned liquid impeller device.

12. Apparatus according to claim 11, wherein the second liquid impelling device is volumetrically adjustable.

13. Apparatus according to claim 6, wherein the liquid impeller device is provided with adjustable blades for variation of the delivery volume.

14. Apparatus according to claim 6, wherein at least one feed duct for infeed of pure oxygen or oxygen mixture opens into the mixing range of said liquid impeller device.

15. Apparatus according to claim 6, wherein said liquid impeller device comprises a vertically extending tubular sheathing element for guiding the throughflowing liquid.

16. Apparatus according to claim 15, wherein the suction aperture of said liquid impeller device is situated below the middle of the basin height.

17. Apparatus as claimed in claim 16, wherein the suction aperture of said liquid impeller device is situated in the region of the bottom of the basin.

18. Apparatus according to claim 6, wherein the activating basin is sealed off at its top side and at least one feed duct is incorporated for infeed of pure oxygen or an oxygen mixture into the space situated the liquid surface.

* * * * *